UNITED STATES PATENT OFFICE.

THE GIANT POWDER COMPANY, OF SAN FRANCISCO, CALIFORNIA, ASSIGNEE, BY MESNE ASSIGNMENTS, OF ALFRED NOBEL.

EXPLOSIVE COMPOUND.

SPECIFICATION forming part of Reissued Letters Patent No. 10,267, dated January 9, 1883.

Original No. 78,317, dated May 26, 1868; Reissue No. 5,619, dated October 21, 1873; Reissue No. 5,799, dated March 17, 1874.
Application for reissue filed December 12, 1882.

*To all whom it may concern:*

Be it known that ALFRED NOBEL, of the city of Hamburg, Germany, did invent a new and useful composition of matter—to wit, an Explosive Powder—of which the following is a specification.

The nature of the invention consists in forming out of two ingredients long known—viz., the explosive substance nitro-glycerine and an inexplosive porous substance hereinafter specified—a composition which, without losing the great explosive power of nitro-glycerine, is very much altered as to its explosive and other properties, being far more safe and convenient for transportation, storage, and use than nitro-glycerine.

In general terms, the invention consists in mixing with nitro-glycerine a substance which possesses a very great absorbent capacity, and which at the same time is free from any quality which will decompose, destroy, or injure the nitro-glycerine or its explosiveness.

It is undoubtedly true, as a general rule, that nitro-glycerine when mixed with another substance possesses less concentration of power than when used alone; but while the safety of the miner (to prevent leakage into seams in the rock) prohibits the use of nitro-glycerine without cartridges — which latter must of course be somewhat less in diameter than the bore-holes which are to contain them—the powder herein-described can be made to form a semi-pasty mass, which yields to the slightest pressure, and thus can be made to fill up the bore-hole entirely. Practically, therefore, the miner will have as much nitro-glycerine in the same height of bore-hole with this powder as with nitro-glycerine in its pure state. This is the real character and purpose of the invention, and in order to enable others skilled in the art to which it appertains or with which it is most nearly connected to make, compound, and use the same, it is herein described, and also the manner and process of making, compounding, and using it in full, clear, and exact terms.

The substance which most fully meets the requirements above mentioned, so far as known to NOBEL at the date of this original application, or he had been then able to ascertain from numerous experiments, was a certain kind of silicious earth or silicic acid found in various parts of the globe and known under the several names of "silicious marl," "tripoli," "rotten stone," &c. The particular variety of this material which is best for the compound is homogeneous, has a low specific gravity, great absorbent capacity, and is generally composed of the remains of infusoria. So great is the absorbent capacity of this earth that it will take up about three times its own weight of nitro-glycerine and still retain its powder form, thus leaving the nitro-glycerine so compact and concentrated as to have very nearly its original explosive power. Whereas, if another substance having a less absorbent capacity is used, a correspondingly less proportion of nitro-glycerine will be absorbed, and the powder be correspondingly weak or wholly inexplosive. For example, most chalk will take but about fifteen per cent. of nitro-glycerine and retain its powder form. Twenty per cent. will reduce it to a paste. Porous charcoal has also a considerable absorbent capacity; but it is itself a combustible material and has less elasticity of its particles, which renders it easy to squeeze out a part of its nitro-glycerine. The two materials are combined in the following manner: The earth, thoroughly dried and pulverized, is placed in a wooden vessel. To it is introduced the nitro-glycerine in a steady stream, so small that the two ingredients can be kept thoroughly mixed. The mixing may be effected by the naked hand or by any proper wooden instrument used in the hand, or by wooden machinery. Sufficient of nitro-glycerine should be used to render the compound explosive, but not so much as to change its form of powder to a liquid or pasty consistency. Practically about sixty parts, by weight, of nitro-glycerine to forty of earth forms the useful minimum, and seventy-eight parts, by weight, of nitro-glycerine to twenty-two of earth the useful maximum of explosive power. The former has a perfectly dry appearance. The latter is pasty. Between these two extremes the composition will be explosive powder, and it will be more easily exploded and its explosive power greater as the relative proportion of the nitro-glycerine is greater. The proportions, by weight, of seventy-five of nitro-glycerine to twenty-five of earth gives a powder as well adapted to ordinary practical purposes as that from any proportions now able to be named, and can easily be compressed to a specific gravity nearly equal to that of pure nitro-glycerine. When the mass has been intimately mixed and thoroughly incorporated by stirring and kneading it is rubbed through a hair, silk, or brass-wire sieve, (iron corrodes,) and any lumps which may remain are rubbed with a stiff bristle-brush till they are reduced and made to pass the sieve. The powder is then finished and ready for use. The fineness desired for the powder will determine the fineness of the sieve to be used.

The chief charactistic of this powder is its nearly perfect exemption from liability to accidental or involuntary explosion. It is far less sensitive than nitro-glycerine to concussion or percussion, and contained in its usual packing—a wooden cask or box—the latter may be smashed completely to pieces without any danger of an explosion. Unlike gunpowder, in the open air or in ordinary packing, a wooden cask or box, it burns up when set fire to without exploding. It can, therefore, be handled, stored, and transported with less danger than ordinary gunpowder. When confined in a tight and strong inclosure it explodes by heat applied in any form when above the temperature of 360° Fahrenheit. Under all other circumstances it may be exploded by some other explosion in it or into it. The most simple and certain method known to me of exploding it is as follows: The end of a common blasting-fuse is inserted into a percussion-cap and the rim of the cap crimped tightly and firmly about the fuse by nippers or other means, so as to leave the fulminating powder of the cap and the end of the fuse tightly and firmly inclosed together. The end of the fuse, with the cap attached, is then embedded in the powder—the more firmly the more certain the explosion.

In blasting, the powder is pressed tightly about the cap and fuse and tamping of sand or other proper material added and pressed, but not pounded in. A tamping firmly pressed is as good as if rammed in the most solid manner. The fuse explodes the cap and this explosion explodes the powder. It is added here that by carefully packing the end of a good fuse amid the powder of a charge inclosed like a blasting-charge in a tight place, the fuse alone will explode the powder, especially if the powder is strongly charged with nitro-glycerine; but this method of explosion requires too much care and is too uncertain to be depended upon or generally used.

As before stated, the more strongly the powder is charged with nitro-glycerine the more easily it explodes. If, therefore, the powder contains a low proportion of nitro-glycerine it is necessary to employ in its explosion a correspondingly long, strong, and heavily charged percussion-cap, made especially for the purpose. For the sake of certainty of explosion it is better to use such a cap in all cases. If the fire from the fuse comes in contact with the powder before the cap is exploded (which is liable to occur if the fuse is leaky and the cap extends too far into the powder) a portion of the powder will be burned before the explosion takes place. To guard against this, the cap should only be fairly inserted into the powder, and poor fuses wound next to the cap firmly with strong glued paper or hemp, or otherwise secured.

The bore-holes, as a practical but not absolute rule, should be about one-half the size and the charge should be from one-fifth to one-tenth the quantity ordinarily used in gunpowder-blasting.

A very convenient form in which to use the powder is to pack it firmly in cartridges of strong paper.

Having thus described the invention, what we claim as the invention of ALFRED NOBEL, and desire to secure by Letters Patent, is—

The composition of matter made substantially of the ingredients and in the manner and for the purposes set forth.

THE GIANT POWDER COMPANY,
By ALBERT DIBBLEE,
*Its President.*
THE ATLANTIC GIANT POWDER COMPANY,
By ALBERT DIBBLEE,
*Its President.*

Witnesses:
JOSEPH K. MARVIN,
IRVING W. SPENCER.